United States Patent
Huang et al.

(10) Patent No.: US 9,417,967 B2
(45) Date of Patent: Aug. 16, 2016

(54) COMPUTING DEVICE AND METHOD FOR AUTOMATICALLY RECOVERING BIOS OF COMPUTING DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Hung-Chi Huang, New Taipei (TW); Ching-Jou Chen, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 111 days.

(21) Appl. No.: 14/526,695

(22) Filed: Oct. 29, 2014

(65) Prior Publication Data

US 2015/0143172 A1    May 21, 2015

(30) Foreign Application Priority Data

Nov. 20, 2013  (TW) .................................. 102142210

(51) Int. Cl.
   *G06F 11/00* (2006.01)
   *G06F 11/14* (2006.01)
   *G06F 11/22* (2006.01)

(52) U.S. Cl.
   CPC ........ *G06F 11/1435* (2013.01); *G06F 11/1417* (2013.01); *G06F 11/2284* (2013.01)

(58) Field of Classification Search
   CPC ............ G06F 11/1417; G06F 11/1466; G06F 11/1451; G06F 11/1453; G06F 11/0706; G06F 11/0793
   See application file for complete search history.

(56) References Cited

U.S. PATENT DOCUMENTS

| | | | | |
|---|---|---|---|---|
| 7,111,201 | B2* | 9/2006 | Largman | G06F 11/1417 713/2 |
| 2003/0126511 | A1* | 7/2003 | Yang | G06F 9/4401 714/39 |
| 2007/0168737 | A1* | 7/2007 | Lee | G06F 11/2284 714/36 |
| 2009/0125709 | A1* | 5/2009 | Martinez | G06F 9/4416 713/2 |
| 2009/0240934 | A1* | 9/2009 | Chou | G06F 11/1417 713/2 |
| 2010/0106956 | A1* | 4/2010 | Guo | G06F 9/4401 713/2 |
| 2010/0205423 | A1* | 8/2010 | Shao | G06F 11/1417 713/2 |
| 2011/0093741 | A1* | 4/2011 | Liang | G06F 11/1417 714/6.1 |
| 2012/0011393 | A1* | 1/2012 | Roberts | G06F 11/1417 714/6.3 |
| 2013/0339780 | A1* | 12/2013 | Lin | G06F 11/0793 714/2 |
| 2015/0074386 | A1* | 3/2015 | Huang | G06F 9/4401 713/2 |
| 2015/0095632 | A1* | 4/2015 | Huang | G06F 11/1417 713/2 |

* cited by examiner

*Primary Examiner* — Bryce Bonzo
*Assistant Examiner* — Jeison C Arcos
(74) *Attorney, Agent, or Firm* — ScienBiziP, P.C.

(57) ABSTRACT

In a method for automatically recovering a basic input-output system (BIOS) of a computing device, the computing device includes a serial peripheral interface (SPI) ROM, a storage device, and a supper I/O (SIO) controller. The SPI ROM stores a first BIOS booting block and a main BIOS, and the SIO controller stores a second BIOS booting block. An integrity of the main BIOS stored in the SPI ROM is checked when the computing device is powered on. The first BIOS booting block boots the computing device when the main BIOS is partially damaged, and the second booting block powers on the computing device when the main BIOS is fully damaged. A backup BIOS is obtained from the storage device, and is written into the SPI ROM to update data of the main BIOS.

18 Claims, 3 Drawing Sheets

COMPUTING DEVICE AND METHOD FOR AUTOMATICALLY RECOVERING BIOS OF COMPUTING DEVICE

CROSS-REFERENCE TO RELATED APPLICATIONS

This application claims priority to Taiwanese Patent Application No. 102142210 filed on Nov. 20, 2013, the contents of which are incorporated by reference herein.

FIELD

Embodiments of the present disclosure relate to computer error recovery systems and methods, and particularly to a computing device and method for automatically recovering a basic input-output system (BIOS) of the computing device.

BACKGROUND

While booting a computing device, a basic input-output system (BIOS) of the computing device is initiated. When the BIOS is executed, a power-on self test (POST) is performed to make sure that hardware of the computing device can be normally operated. When the POST is finished, the BIOS tries to read a sector of the hard disk which is called the master boot record (MBR). The data in the MBR are loaded into a memory to be executed, and then data provided by an operating system (OS) is loaded to enter the operating system.

If errors occur in the BIOS, the BIOS stored in a flash memory of the computing device needs to be recovered to boot the computing device normally. However, it is difficult or problematic to recover the BIOS if main program codes of the BIOS are damaged. Thus, the computing device needs to be sent back to the original manufacturer to recover the BIOS.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
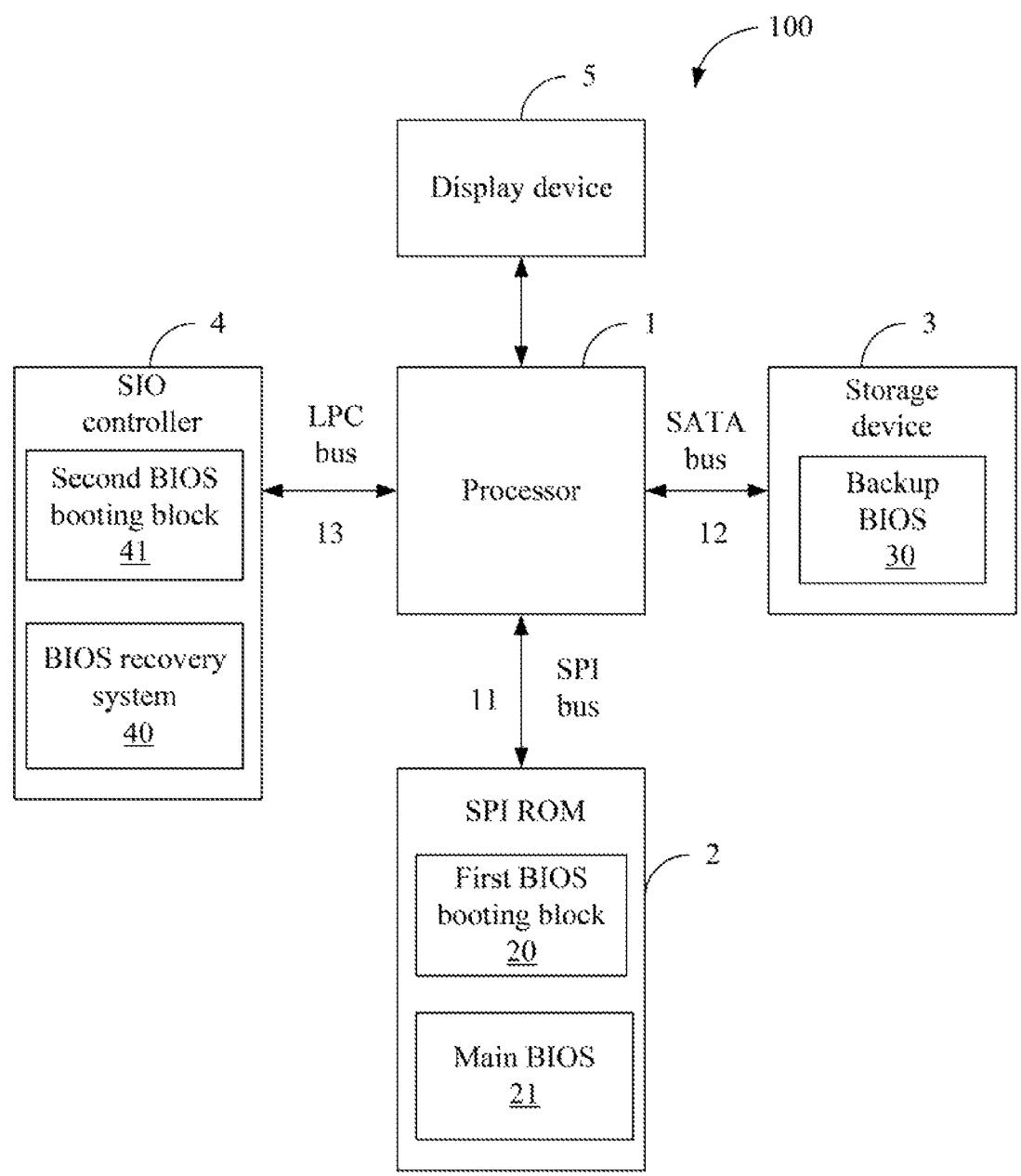
FIG. 1 illustrates a block diagram of an example embodiment of a computing device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented. The term "module" refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of an example embodiment of a computing device 100 including a basic input-output system (BIOS) recovery system 40. In the embodiment, the computing device 100 includes, but is not limited to, at least one processor 1, a serial peripheral interface (SPI) ROM 2, a storage device 3, a supper I/O (SIO) controller 4, and a display device 5. The BIOS recovery system 40 is embedded in the SIO controller 4, and is implemented by the at least one processor 1 of the computing device 100. The SPI ROM 2 connects to the at least one processor 1 through a SPI bus 11, the storage device 3 connects to the at least one processor 1 through a serial advanced technology attachment (SATA) bus 1, and the SIO controller 4 connects to the at least one processor 1 through a low pin count (LPC) bus 13. The display device 5 connects to the at least one processor 1 through a display connection, such as a video graphics array (VGA) port, a digital visual interface (DVI), or other display ports. In one embodiment, the computing device 100 may be a personal computer, a server computer, a workstation computer, a notebook computer, or other computing system.

The at least one processor 1 is a central processing unit (CPU) or microprocessor that performs various functions of the computing device 100. In one embodiment, the storage device 3 may be an internal storage system, such as a flash memory, a random access memory (RAM) for temporary storage of information, and/or a read only memory (ROM) for permanent storage of information. The storage device 3 may also be an external storage system, such as an external hard disk, a storage card, or a data storage medium.

The SPI ROM 2 is a BIOS memory that stores a first BIOS booting block 20 and a main BIOS 21. In the embodiment, the first BIOS booting block 20 invokes the main BIOS 21 to perform a power-on self test (POST) for the computing device 100 when the computing device 100 is powered on. The main BIOS 21 is executed to perform the POST process of the computing device 100 and loads an operating system (OS) of the computing device 100.

The storage device 3 stores a backup BIOS 30, which is identical to the main BIOS 22 stored in the SPI ROM 2. The backup BIOS 30 is used to recover the main BIOS 21 of the SPI ROM 2 when the main BIOS 21 of the SPI ROM 2 is damaged, so as to make sure that the computing device 100 is powered on normally. In one embodiment, the main BIOS 21 of the SPI ROM 2 may be partially damaged (e.g., data corruption) because a part of data of the main BIOS 21 is corrupted or damaged. In other embodiment, the main BIOS 21 may be fully erased (e.g., data erase) from the SPI ROM 2 since the SPI ROM 2 occurs physical errors.

The SIO controller 4 is a supper I/O embedded controller located at a LPC chipset, and monitors and manages hardware of the computing device 100, including a hard disk drive (HDD), a printer, a power supply, a audio card, and a video card, through COM ports and serial ports. The SIO controller 4 stores a second BIOS booting block 41, which is identical to the first BIOS booting block 20 stored in the SPI ROM 2. The second BIOS booting block 41 of the SIO controller 4 invokes the main the BIOS 21 to perform the POST for the computing device 100 when the first BIOS booting block 20 of the SPI ROM 2 is fully or partially damaged, so as to make sure that the computer device 100 powers on normally.

In one embodiment, the BIOS recovery system 40 may comprise computerized instructions in the form of one or more program codes that are embedded in a flash ROM of the SIO controller 4. The BIOS recovery system 40 may also be stored in a non-transitory computer-readable medium such as the storage device 3. When the main BIOS 21 of the SPI ROM 2 is partly damaged, the BIOS recovery system 40 powers on the computing device 100 using the first BIOS booting block 20 of the SPI ROM 2, and recovers the main BIOS 21 of the SPI ROM 2 using the backup BIOS 30 of the storage device 3. When the main BIOS 21 of the SPI ROM 2 is completely damaged, the BIOS recovery system 40 powers on the computing device 100 using the second BIOS booting block 41 of the SIO controller 4, and recovers the main BIOS 21 of the SPI ROM 2 using the backup BIOS 30 of the storage device 3.

Figure 2:
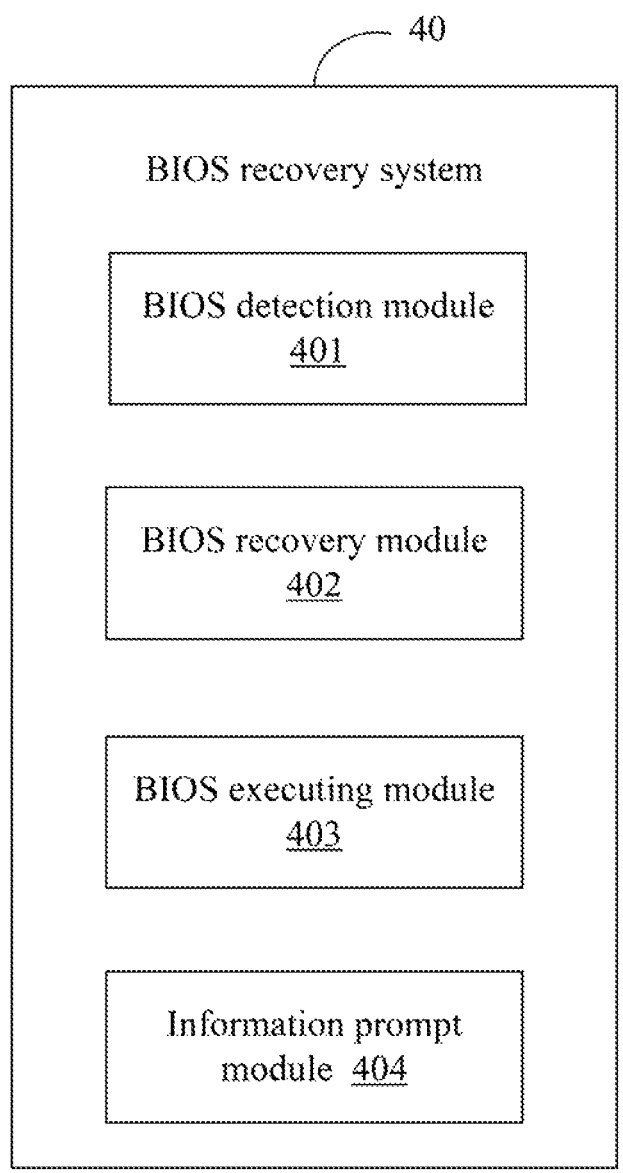
FIG. 2 is a block diagram illustrating function modules of a BIOS recovery system included in the computing device.

FIG. 2 is a block diagram illustrating function modules of the BIOS recovery system 40. In the embodiment, the BIOS recovery system 40 includes a BIOS detection module 401, a BIOS recovery module 402, a BIOS executing module 403, and an information prompt module 404. The modules 401-404 may comprise computerized instructions in the form of one or more computer-readable programs that are stored in a non-transitory computer-readable medium (such as the storage device 3 or a memory of the SIO controller 4) and executed by the at least one processor 1. The modules 401-404 can be include the computerized instructions to execute the method as described below in relation to FIG. 3.

Figure 3:
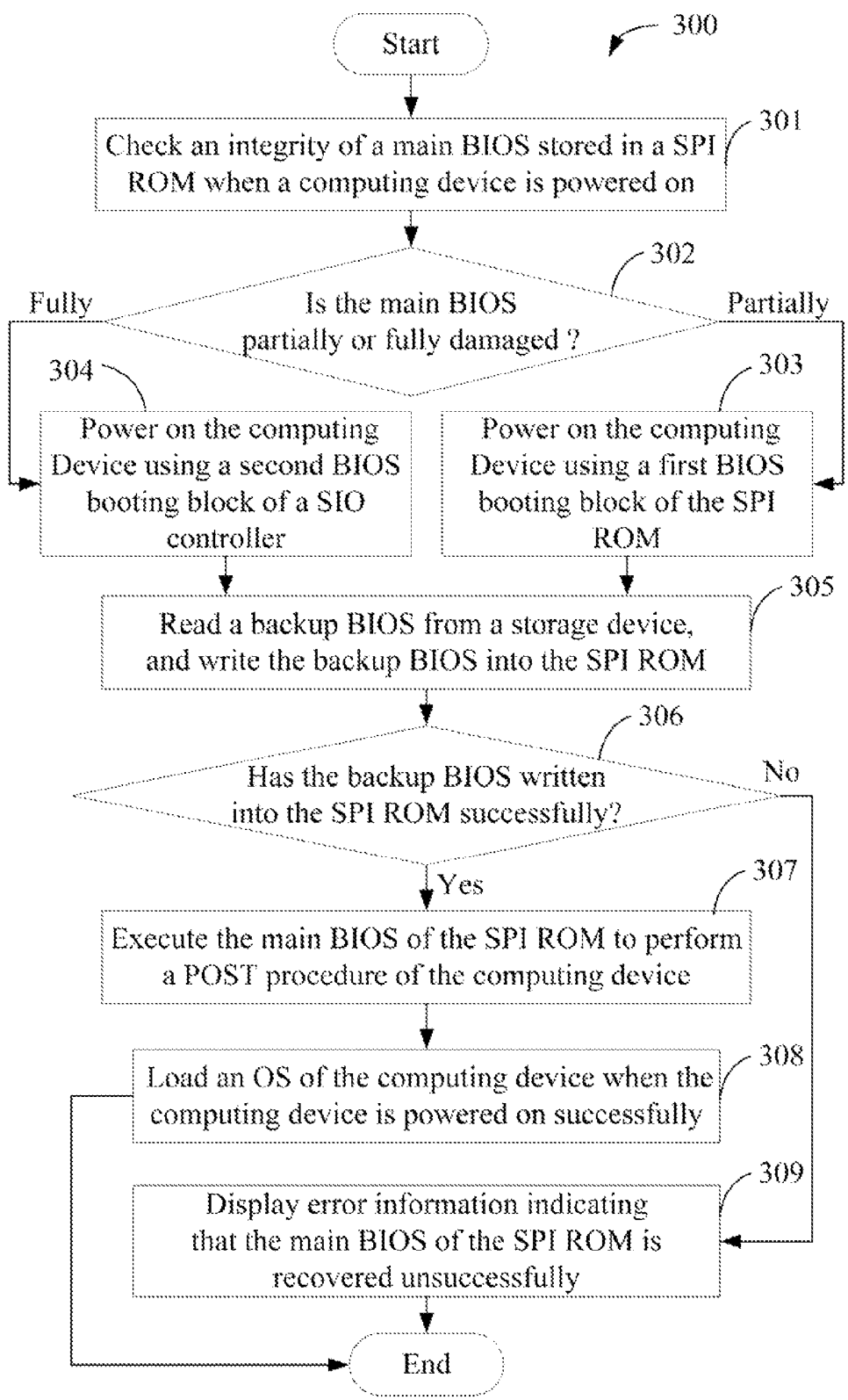
FIG. 3 is a flowchart of an example embodiment of a method for automatically recovering a basic input-output system (BIOS) of the computing device.

FIG. 3 illustrates a flowchart of an example embodiment of a method for automatically recovering a basic input-output system (BIOS) of a computing device. In the example embodiment, the method 300 s performed by execution of computer-readable software program codes or instructions by at least one processor of a computing device, such as the computing device 100 of FIG. 1.

Referring to FIG. 3, a flowchart is presented in accordance with an example embodiment. In the embodiment, the example method 300 is provided by way of example only as there are a variety of ways to carry out the method. The method 300 described below can be carried out using the configurations illustrated in FIG. 1 and FIG. 2, for example, and various elements of the figure are referenced in explaining the example method 300. Each block shown in FIG. 3 represents one or more processes, methods or subroutines, carried out in the exemplary method 300. Additionally, the illustrated order of blocks is by example only and the order of the blocks can be changed according to the present disclosure. The exemplary method 300 can begin at block 301.

At block 301, the BIOS detection module 401 checks an integrity of the main BIOS 21 stored in the SPI ROM 2 when the computing device 100 is powered on. In one embodiment, the main BIOS 21 of the SPI ROM 2 may be partially damaged (e.g., data corruption) when a part of data of the main BIOS 21 is corrupted or damaged. In other embodiment, the main BIOS 21 may be fully erased (e.g., data erase) from the SPI ROM 2 when the SPI ROM 2 occurs physical errors.

At block 302, the BIOS detection module 401 determines whether the main BIOS 21 is partially damaged or fully damaged according to the checking result. If the main BIOS 21 is fully damaged (e.g., data erase of the main BIOS 21), block 303 is implemented. Otherwise, if the main BIOS 21 is partially damaged (e.g., data corruption of the main BIOS 21), block 304 is implemented.

At block 303, the BIOS recovery module 402 powers on the computing device 100 using a first BIOS booting block 20 stored in the SPI ROM 2.

At block 304, the BIOS recovery module 402 powers on the computing device 100 using a second BIOS booting block 41 stored in the SIO controller 4. In the embodiment, the second BIOS booting block 41 stored in the SIO controller 4 is identical to the first BIOS booting block 20 stored in the SPI ROM 2.

At block 305, the BIOS recovery module 402 reads a backup BIOS 30 from the storage device 3, and writes the backup BIOS 30 into the SPI ROM 2 to update the damaged data of the main BIOS 21. In the embodiment, the BIOS recovery module 402 transmits the copy of the backup BIOS from the storage device 3 to the SPI ROM 2 to update the damaged data of the main BIOS 21.

At block 306, the BIOS recovery module 402 determines whether the backup BIOS 30 is written into the SPI ROM 2 successfully. If the backup BIOS 30 is written into the SPI ROM 2 successfully, block 307 is implemented. Otherwise, if he backup BIOS 30 is written into the SPI ROM 2 unsuccessfully, block 309 is implemented.

At block 307, the BIOS executing module 403 executes the main BIOS 21 of the SPI ROM 2 to perform a POST procedure of the computing device 100 normally.

At block 308, the BIOS executing module 403 loads an operating system (OS) of the computing device 100 when the computing device 100 is powered on successfully. In the embodiment, the computing device 100 enters the OS after the computing device 100 is powered on successfully.

In step 309, the information prompt module 404 displays error information on the display device 5 of the computing device 100. In the embodiment, the error information indicates that the main BIOS 21 is recovered unsuccessfully. The SPI ROM 2 may occur physical errors, so that the backup BIOS 30 cannot be written into the SPI ROM 2 to recover the main BIOS 21.

All of the processes described above may be embodied in, and fully automated via, functional code modules executed by one or more general purpose processors of computing devices. The code modules may be stored in any type of non-transitory readable medium or other storage device. Some or all of the methods may alternatively be embodied in specialized hardware. Depending on the embodiment, the non-transitory computer-readable medium may be a hard disk drive, a compact disc, a digital video disc, a tape drive or other suitable storage medium.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in particular the matters of shape, size and arrangement of parts within the principles of the present disclosure, up to and including the full extent established by the broad general meaning of the terms used in the claims.

What is claimed is:

1. A computing device, comprising:
a serial peripheral interface (SPI) ROM configured to store a first basic input-output system (BIOS) booting block and a main BIOS;
a super I/O controller configured to store a second BIOS booting block; and
a storage device configured to store a computer-readable program comprising instructions that, when executed by at least one processor, cause the at least one processor to:
check an integrity of the main BIOS when the computing device is powered on;
determine whether the main BIOS is partially or fully damaged according to the checking result;
power on the computing device using the first BIOS booting block when the main BIOS is partially damaged;
power on the computing device using the second BIOS booting block when the main BIOS is fully damaged; and
read a backup BIOS stored in the storage device, and write the backup BIOS into the SPI ROM to update data of the main BIOS by transmitting a copy of the backup BIOS from the storage device to the SPI ROM.

2. The computing device according to claim 1, wherein the computer-readable program further causes the at least one processor to determine whether the backup BIOS is written into the SPI ROM successfully.

3. The computing device according to claim 2, wherein the computer-readable program further causes the at least one processor to execute the main BIOS to perform a power-on self test (POST) procedure of the computing device when the backup BIOS is written into the SPI ROM successfully, and load an operating system (OS) of the computing device when the computing device is powered on successfully.

4. The computing device according to claim 2, wherein the computer-readable program further causes the at least one processor to display error information on a display device of the computing device when the backup BIOS is written into the SPI ROM unsuccessfully.

5. The computing device according to claim 1, wherein the second BIOS booting block is identical to the first BIOS booting block stored in the SPI ROM.

6. The computing device according to claim 1, wherein the second BIOS booting block invokes the main the BIOS to perform the POST for the computing device when the first BIOS booting block is fully or partially damaged.

7. A method for automatically recovering a basic input-output system (BIOS) of a computing device, the computing device comprising a serial peripheral interface (SPI) ROM, and a super I/O (SIO) controller, the method comprising:
checking an integrity of a main BIOS stored in a serial peripheral interface (SPI) ROM when the computing device is powered on;
determining whether the main BIOS is partially or fully damaged according to the checking result;
powering on the computing device using a first BIOS booting block stored in the SPI ROM when the main BIOS is partially damaged;
powering on the computing device using the second BIOS booting block stored in a super I/O (SIO) controller when the main BIOS is fully damaged; and
reading a backup BIOS stored in a storage device, and writing the backup BIOS into the SPI ROM to update data of the main BIOS by transmitting a copy of the backup BIOS from the storage device to the SPI ROM.

8. The method according to claim 7, further comprising:
determining whether the backup BIOS is written into the SPI ROM successfully.

9. The method according to claim 8, further comprising:
executing the main BIOS to perform a power-on self test (POST) procedure of the computing device when the backup BIOS is written into the SPI ROM successfully; and
loading an operating system (OS) of the computing device when the computing device is powered on successfully.

10. The method according to claim 8, further comprising:
displaying error information on a display device of the computing device when the backup BIOS is written into the SPI ROM unsuccessfully.

11. The method according to claim 7, wherein the second BIOS booting block is identical to the first BIOS booting block stored in the SPI ROM.

12. The method according to claim 7, wherein the second BIOS booting block invokes the main the BIOS to perform the POST for the computing device when the first BIOS booting block is fully or partially damaged.

13. A non-transitory storage medium having stored thereon instructions that, when executed by at least one processor of a computing device, causes the least one processor to execute instructions of a method for automatically recovering a basic input-output system (BIOS) of the computing device, the computing device comprising a serial peripheral interface (SPI) ROM, and a super I/O (SIO) controller, the method comprising:
checking an integrity of a main BIOS stored in a serial peripheral interface (SPI) ROM when the computing device is powered on;
determining whether the main BIOS is partially or fully damaged according to the checking result;
powering on the computing device using a first BIOS booting block stored in the SPI ROM when the main BIOS is partially damaged;
powering on the computing device using the second BIOS booting block stored in a super I/O (SIO) controller when the main BIOS is fully damaged; and
reading a backup BIOS stored in a storage device, and writing the backup BIOS into the SPI ROM to update data of the main BIOS by transmitting a copy of the backup BIOS from the storage device to the SPI ROM.

14. The storage medium according to claim 13, wherein the method further comprises:
determining whether the backup BIOS is written into the SPI ROM successfully.

15. The storage medium according to claim 14, wherein the method further comprises:
executing the main BIOS to perform a power-on self test (POST) procedure of the computing device when the backup BIOS is written into the SPI ROM successfully; and
loading an operating system (OS) of the computing device when the computing device is powered on successfully.

16. The storage medium according to claim 14, wherein the method further comprises:
displaying error information on a display device of the computing device when the backup BIOS is written into the SPI ROM unsuccessfully.

17. The storage medium according to claim 13, wherein the second BIOS booting block is identical to the first BIOS booting block stored in the SPI ROM.

18. The storage medium according to claim 13, wherein the second BIOS booting block invokes the main the BIOS to perform the POST for the computing device when the first BIOS booting block is fully or partially damaged.

* * * * *